(12) United States Patent
Tsuji et al.

(10) Patent No.: US 6,432,579 B1
(45) Date of Patent: Aug. 13, 2002

(54) METHOD OF MANUFACTURING SECONDARY BATTERY NEGATIVE ELECTRODE

(75) Inventors: Ryuichi Tsuji; Kuniyuki Nakanishi; Toru Nishimura; Tadashi Hirabayashi; Atsushi Suzuki, all of Wakayama (JP)

(73) Assignee: Kao Corporation, Tokyo (JP)

( * ) Notice: Subject to any disclaimer, the term of this patent is extended or adjusted under 35 U.S.C. 154(b) by 0 days.

(21) Appl. No.: 09/463,456

(22) PCT Filed: May 25, 1999

(86) PCT No.: PCT/JP99/02729

§ 371 (c)(1),
(2), (4) Date: Jan. 27, 2000

(87) PCT Pub. No.: WO99/62131

PCT Pub. Date: Dec. 2, 1999

(30) Foreign Application Priority Data

May 25, 1998 (JP) ............................................. 10-142960

(51) Int. Cl.[7] .............................................. H01M 4/58
(52) U.S. Cl. .............................. 429/218.1; 429/231.95; 29/623.1; 29/623.3; 29/623.5; 427/115
(58) Field of Search ........................ 429/231.95, 218.1; 29/623.1, 623.3, 623.5; 427/115

(56) References Cited

U.S. PATENT DOCUMENTS

| | | | | |
|---|---|---|---|---|
| 6,042,969 A | * | 3/2000 | Yamada et al. | 429/218.1 |
| 6,066,414 A | * | 5/2000 | Imoto et al. | 429/218.1 |
| 6,083,644 A | * | 7/2000 | Watanabe et al. | 429/231.1 |
| 6,165,642 A | * | 12/2000 | Kawakami et al. | 429/218.1 |
| 6,235,427 B1 | * | 5/2001 | Idota et al. | 429/218.1 |

FOREIGN PATENT DOCUMENTS

| | | |
|---|---|---|
| EP | A-1903797 | 3/1999 |
| JP | 6223433 | 5/1987 |
| JP | 62122066 A | 6/1987 |
| JP | 01204361 A | 8/1989 |
| JP | 02066856 A | 3/1990 |
| JP | 04190555 A | 7/1992 |
| JP | 05074463 A | 3/1993 |
| JP | 05144474 A | 6/1993 |
| JP | 05299090 A | 11/1993 |
| JP | 07029602 A | 1/1995 |
| JP | A-7326346 | 12/1995 |
| JP | A-8148141 | 6/1996 |
| JP | 08180904 A | 7/1996 |
| JP | A-8213012 | 8/1996 |
| JP | 08222273 A | 8/1996 |
| JP | A-8236104 | 9/1996 |
| JP | A-9 7638 | 1/1997 |
| JP | 09249407 A | 9/1997 |
| WO | WO/98 24135 | 4/1998 |

* cited by examiner

Primary Examiner—Patrick Ryan
Assistant Examiner—Angela J Martin
(74) Attorney, Agent, or Firm—Birch, Stewart, Kolasch & Birch, LLP

(57) ABSTRACT

The present invention relates to a process for producing an anode for a secondary battery, which is capable to reduce a contact resistance between a sintered material which contains silicon as an anode active material and a current collector. A binder and a solvent are mixed with a silicon-containing anode material to prepare a slurry. A base material made of a foil or mesh of conductive metal is coated with the slurry, and the solvent is removed to form a coated film. The coated film is sintered in a non-oxidizing atmosphere, thereby integrating a sintered material of the coated film with the base material.

8 Claims, No Drawings

METHOD OF MANUFACTURING SECONDARY BATTERY NEGATIVE ELECTRODE

This application is the national phase under 35 U.S.C. §371 of PCT International Application No. PCT/JP99/02729 which has an International filing date of May 25, 1999, which designated the United States of America.

BACKGROUND OF THE INVENTION

1. Field of the Invention

The present invention relates to an anode for a secondary battery using, as an electrode material, a sintered material which contains silicon as an active material, a process for producing the same, and a non-aqueous secondary battery using the same.

2. Description of the Related Art

With the popularization of portable telephones and note-type personal computers, high-capacity lithium secondary batteries containing a cathode active material and an anode active material, capable of incorporating and releasing lithium ions, have attracted special interest. Among them, demands for space-saved, thin square-shaped batteries have been particularly enhanced. For the purpose of enhancing the efficiency of the battery reaction by increasing the electrode area, a cathode and an anode obtained by coating a belt-shaped metal foil with a coating composition containing an active material, a binder and a conductive material are used in a current square-shaped battery, and these electrodes are contained in a battery can after winding, together with a separator, and pressing.

This electrode is composed of about 40% by volume of an active material, 20 to 30% by volume of a binder, a conductive material and a metal foil, and 30 to 40% by volume of pores. Accordingly, there is a problem that those which do not contribute intrinsically to the capacity of the battery, such as binder, conductive material and metal foil limit the battery capacity per volume. When the wound electrodes described above are contained in the square-shaped can, it is impossible to fill corner portions of the battery and a useless space is formed. Therefore, the capacity per unit volume is further lowered.

Thus, a trial of forming the electrode of a sintered material made substantially of an active material has been made as a means for increasing the capacity per unit volume. When the electrode is formed of the sintered material, it is possible to eliminate the binder and to eliminate the conductive material or to reduce its amount, thereby making it possible to increase the filling density of the active material and to enhance the capacity per unit volume. For example, Japanese Patent Laid-Open Publication No. 5-299090 discloses an anode obtained by contact-bonding of a copper foil to a sintered material of a petroleum pitch or a carbonaceous material, while Japanese Patent Laid-Open Publication No. 8-180904 discloses a cathode formed of a sintered material of a composite oxide containing lithium and metal.

As the anode active material, carbon materials, for example, amorphous carbon such as coke (e.g. Japanese Patent Laid-Open Publication No. 62-122066 and 1-204361) and glassy carbon (e.g. Japanese Patent Laid-Open Publication No. 2-66856); and natural graphite (e.g. Japanese Patent Publication No. 62-23433) or artificial graphite (e.g. Japanese Patent Laid-Open Publication No. 4-190555) have been suggested. However, the battery capacity per unit volume is not sufficient even in case where any of amorphous and crystalline carbon materials is used and, therefore, a further improvement in performance is desired.

To increase the battery capacity per unit volume, a trial of using silicon or its compound as the anode active material to form an anode has been made. For example, Japanese Patent Laid-Open Publication No. 7-29602 discloses a process of producing an anode, which contains using $Li_xSi$ ($0 \leq x \leq 5$) as an anode active material, adding graphite as a conductive material and a binder, forming the mixture into pellets and using a conductive adhesive as a current collector. Japanese Patent Laid-Open Publication No. 5-74463 discloses a process of producing an anode, which contains using a silicon single crystal as an active material and interposing it between nickel meshes.

However, even if an anode which contains silicon as the active material is formed of a sintered material so as to increase the capacity per unit volume, the internal resistance of the battery is increased by a large contact resistance between a current collector and a sintered material, whereby the capacity is not improved necessarily at present.

In view of the requisite capacity in case of using in the portable telephone, the base area of the electrode is preferably 4 cm² or more because of limitation of the thickness of the battery.

However, in the anode sintered material composed mainly of silicon, those satisfying these requirements simultaneously could have not obtained by a conventionally known technique.

SUMMARY OF THE INVENTION

It is, therefore, an object of the present invention to provide a process for producing an anode for a secondary battery, capable of reducing contact resistance between a current collector and a sintered material in an anode which contains silicon as an active material.

By sintering a silicon-containing coated film and a base material made of a foil or mesh of conductive material, a high capacity can be obtained. That is, the process for producing an anode for the secondary battery of the present invention comprises: (a) adding a binder and a solvent to a silicon-containing anode material to prepare a slurry; (b) coating a base material made of a foil or mesh of conductive metal with the slurry, and then removing the solvent to form a coated film; and (c) sintering the coated film in a non-oxidizing atmosphere, thereby integrating a sintered material of the coated film with the base material.

By sintering a silicon-containing coated film and a base material made of conductive metal in a non-oxidizing atmosphere, the contact area of interface between a sintered material and a current collector are increased, and the sintered material is integrated with the current collector, thereby making it possible to reduce the contact resistance between the sintered material and the current collector and to provide an anode of a thin film whose conductivity has been improved.

The anode material preferably contains a material to be carbonized by a heat treatment, or a carbon material. In that case, it is preferred to use a composite powder obtained by heat-treating silicon or its compound at a temperature within a range from 600 to 1400° C. in a non-oxidizing atmosphere in the presence of a material to be carbonized by the heat treatment, or a carbon material.

The coated film is preferably sintered at a temperature lower than the melting point of conductive metal base material, thereby making it possible to integrate the sintered material with the base material without causing thermal deformation of the base material.

By using any one metal selected from stainless steel, elements of the upper group and elements of the platinum group as the conductive metal, there can be obtained a current collector which is electrochemically stable even in a reduced state of the anode and has high conductivity.

The anode for the secondary battery according to the present invention is characterized by an anode obtained by the process of sintering a coated film which is formed on a base material made of a foil or mesh of conductive metal and comprises a silicon-containing anode material and a binder, thereby to integrate the anode sintered material with the base material.

The anode for secondary battery according to the present invention can also be obtained by peeling a coated film from a base film for coating, pressing the coated film to a base material made of a foil or mesh of it conductive metal, and sintering them, thereby integrating a sintered material of the coated film with the base material. When using the base film for coating, it also becomes possible to continuously process drying of a coated film coated with the slurry, peeling of the coated film and recovery of the coated film, using a coated film winder, thereby simplifying the production process.

The thickness of the anode sintered material is preferably in a range of 10 to 500 $\mu$m, and the base area is preferably 4 cm$^2$ or more. Furthermore, the sintered material preferably contains 30 to 90% by weight of silicon and 10 to 70% by weight of a carbon material.

The non-aqueous secondary battery of the present invention comprises an anode obtained by sintering a coated film comprising a silicon-containing anode material, a binder and a base material made of a foil or net of conductive material, thereby integrating a sintered material of the coated film with the base material; a cathode made of a lithium transition metal oxide as an effective ingredient; and an electrolyte obtained by dissolving a lithium compound in an organic solvent, or a solid electrolyte containing a lithium ion-conductive non-aqueous electrolyte, the solid electrolyte is obtained by incorporating a lithium compound into a polymer in a solid state or retaining the organic solvent containing the lithium compound dissolved therein with the polymer. It is preferred to use a sintered material made of a lithium transition metal oxide as a cathode.

The non-aqueous secondary battery of the present invention is preferably subjected to an electrochemical charge and discharge treatment. Not only charging/discharging at a high current density can be conducted, but also a high capacity can be obtained.

DESCRIPTION OF THE PREFERRED EMBODIMENTS

This application is based on application No.10-142960 filed May 25, 1998 in Japan, the content of which is incorporated hereinto by reference.

The anode used in the present invention contains silicon as the anode active material. The silicon powder used in the present invention may be any of amorphous and crystalline of elemental substance of silicon. Furthermore, the silicon compound which can be converted into silicon by decomposing or reducing in a non-oxidizing atmosphere, for example, inorganic silicon compound such as silicon oxide; and organic silicon compound such as silicone resin and silicon-containing polymer compound, can be used in the present invention. Among them, the elemental substance of silicon is particularly preferred. The purity of the silicon powder is not specifically limited, however, the silicon content is preferably 90% by weight or more so as to obtain a sufficient capacity, and is preferably 99.999% by weight or less in view of economical efficiency. The particle diameter of the silicon powder is not specifically limited, however, those having an average particle diameter of 0.01 to 100 $\mu$m are preferably used in view of handling, cost of raw material and uniformity of the anode material.

The anode material used in the present invention is preferably a composite powder including the carbon material. The composite powder is made by subjecting silicon or its compound to a heat treatment in a non-oxidizing atmosphere at a temperature within a range where silicon is not molten and sufficient sintering can be conducted, for example, 600 to 1400° C., preferably 800 to 1200° C. in the presence of a carbon material or a material to be carbonized by the heat treatment. The carbon material used herein includes, for example, coke, glassy carbon, graphite, carbonized pitch, and a mixture thereof.

The material to be carbonized by the heat treatment includes, for example, thermosetting resin such as phenol resin, epoxy resin, unsaturated polyester resin, furan resin, urea resin, melamine resin, alkyd resin, and xylene resin; condensed polycyclic hydrocarbon compound or its derivative, such as naphthalene, acenaphthylene, phenanthrene, anthracene, triphenylene, pyrene, chrysene, naphthacene, picene, perylene, pentaphene, and pentacene; or pitch containing a mixture of the above condensed polycyclic hydrocarbon compound or its derivative compound as a main component. Among them, pitch is preferred.

The conductive metal used as the base material may be any one metal selected from stainless steel, elements of the copper group and elements of the platinum group, but is preferably copper which is easily reduced, and has high electric conductivity and cheap price. As the conductive metal, a foil or mesh may be used but the thickness is preferably from 3 to 100 $\mu$m.

The base film for coating may be any one which has smooth surface and is capable of peeling a coated film, and there can be used a polymer film of polyethylene, polypropylene, polyethylene terephthalate, and polyethylene naphthalate. These films are preferably subjected to a peeling treatment. The thickness is preferably from 3 to 100 $\mu$m.

When the conductive base material or base film for coating is coated with the anode material, a publicly known binder dissolved in a suitable solvent such as water and N-methyl-2-pyrrolidone can be used. As the solvent, any of aqueous and non-aqueous solvents may be used. As such a binder, for example, there can be used any conventionally known materials such as polytetrafluoroethylene, polyvinylidene fluoride, polyethylene, polypropylene, polyvinyl alcohol, and polyvinyl pyrrolidone.

The temperature at which the anode material to be sintered is preferably lower than the melting point of the conductive metal to be used. When using copper, the temperature is lower than the melting point of copper 1083° C., and preferably from 500 to 900° C. The sintering of the anode coated film and the sintering for producing a composite powder which contains silicon and a carbon material can be combined.

The thickness of the anode sintered material is preferably 10 $\mu$m or more in view of the strength, and is preferably 500 $\mu$m or less in view of the performance at a high current density.

On formation of the battery, the base area of the anode sintered material is preferably 4 cm$^2$ or more so as to realize easy handling.

The sintered material of the present invention is preferably a porous material having a porosity of 15 to 60% so that the electrolyte is sufficiently made contact with the active material.

The cathode active material in the present invention may be any conventionally known material, and examples thereof include $Li_xCoO_2$, $Li_xNiO_2$, $MnO_2$, $Li_xMnO_2$, $Li_xMn_2O_4$, $Li_xMn_{2-y}O_4$, $\alpha\text{-}V_2O_5$, and $TiS_2$.

The non-aqueous electrolyte used in the present invention may be a non-aqueous liquid electrolyte dissolving a lithium compound in an organic solvent, or a polymer solid electrolyte obtained by incorporating a lithium compound into a polymer in a solid state or retaining the organic solvent containing the lithium compound dissolved therein with the polymer. The non-aqueous liquid electrolyte is prepared by appropriately combining an organic solvent with an electrolyte, and the organic solvent and electrolyte may be any one which can be used in this kind of the battery. The organic solvent includes, for example, propylene carbonate, ethylene carbonate, vinylene carbonate, dimethyl carbonate, diethyl carbonate, methylethyl carbonate, 1,2-dimethoxyethane, 1,2-diethoxyethanemethylformate, butyrolactone, tetrahydrofuran, 2-metyhyltetrahydrofuran, 1,3-dioxorane, 4-methyl-1,3-dioxofuran, diethyl ether, sulfolane, methylsulfolane, acetonitrile, propionitrile, butyronitrile, valeronitrile, benzonitrile, 1,2-dichloroethane, 4-methyl-2-pentanone, 1,4-dioxane, anisole, diglyme, dimethylformamide and dimethyl sulfoxide. These solvents can be used alone, or two or more kinds of them can also be used in combination.

The electrolyte includes, for example, $LiClO_4$, $LiAsF_6$, $LiPF_6$, $LiBF_4$, $LiB(C_6H_5)_4$, $LiCl$, $LiBr$, $LiI$, $LiCH_3SO_3$, $LiCF_3SO_3$, and $LiAlCl_4$. These electrolytes can be used alone, or two or more kinds of them can also be used in combination.

The polymer solid electrolyte used in the present invention may be those obtained by incorporating an electrolyte selected from the above electrolytes into a polymer described below in a solid state. The polymer includes, for example, polymer having a polyether chain, such as polyethylene oxide and polypropylene oxide; polymer having a polyester chain, such as polystyrene succinate and polycaprolactam; polymer having a polyamine chain, such as polyethyleneimine; and polymer having a polysulfide chain, such as polyalkylenen sulfide. The polymer solid electrolyte used in the present invention may be plasticized polymer obtained by supporting the above non-aqueous liquid electrolyte with a polymer such as polyvinylidene fluoride, vinylidene fluoride-tetrafluoroethylene copolymer, polyethylene oxide, polyacrylonitrile, and polypropylene oxide.

The battery thus assembled using the above members is characterized by passing through the process of charging/discharging at a low current (aging process), thereby enabling the battery to exert charge/discharge at a high current density and high capacity. The reason why the charge/discharge efficiency at a high current density of the battery produced without passing through the process is low is assumed as follows. That is, the reaction with such a structural change that crystalline silicon is converted into amorphous silicon by incorporating lithium into crystalline silicon is too slow to follow up the charge/discharge reaction at high current density.

The following Examples further illustrate the present invention in detail but the present invention is not limited to the Examples.

EXAMPLE 1

An anode was made in the following procedure. A commercially available crystalline silicon powder having a purity of 99.9% and an average particle diameter of 1 μm and a phenol resin were mixed in an equivalent weight amount with stirring, and then cured at 80° C. for three days. The phenol resin used herein is that obtained by mixing 150 weight parts of cresol (content of m-cresol: 38%) with 135 weight parts of an aqueous 30% formaldehyde solution and 7.5 weight parts of 25% ammonia water, heating the mixture at 85° C. for 105 minutes and removing water by vacuum distillation. The resulting cured silicon-containing phenol resin was sintered at 1100° C. in a nitrogen atmosphere for three hours, and then dry-ground to obtain a silicon/carbon composite powder. This powder was converted into a slurry by using a solution of polyvinylidene fluoride, as a binder, in N-methyl-2-pyrrolidone, and then both surfaces of a copper mesh were coated with the slurry. The coated copper mesh was dried at 80° C. and then cut into pieces having a size of 22 mm×20 mm. The copper mesh was exposed in the width of only 2 mm for current correction, followed by contact-bonding using a plate pressing machine. The resulting copper mesh-containing coated film was used as an anode after sintering at 900° C. in a nitrogen atmosphere for three hours. The thickness of an anode sintered material was 220 μm.

A cathode was made in the following procedure. Lithium carbonate $Li_2CO_3$ and cobalt carbonate $CoCO_3$ were weighed in a molar ratio of 1:2 and then wet-mixed in a ball mill using isopropyl alcohol, followed by evaporation of the solvent and further calcinating at 800° C. for one hour. The calcinated powder was ground again by using a vibration mill and formed into a pellet of 20 mm×20 mm×0.5 mm in thickness under a pressure of 1.3 ton/cm², which was then sintered at 800° C. for 10 hours to obtain a cathode.

Those prepared by dissolving 1 mol/L of lithium hexafluorophosphate in a mixed solvent of ethylene carbonate and dimethyl carbonate in a volume ratio of 1:1 were used as an electrolyte.

The square-shaped battery thus obtained was allowed to stand at room temperature for 24 hours and then the following charge/discharge test was conducted. This battery was charged at a fixed current of 1.5 mA and its discharge capacity was examined. The charge/discharge cycle started from charging.

EXAMPLE 2

An anode was made in the following procedure. A silicon powder was converted into a slurry by using a solution of polyvinylidene fluoride, as a binder, in N-methyl-2-pyrrolidone and, after coating a copper mesh with the slurry, the coated copper mesh was cut into pieces having a size of 22 mm×20 mm. After sintering at 750° C. for three hours, the same operation as in Example 1 was conducted to obtain an anode. The thickness of an anode sintered material was 200 μm.

Then, a square-shaped battery was produced in the same manner as in Example 1 and a charge/discharge test was conducted. The results are shown in Table 1.

EXAMPLE 3

An anode was made in the following procedure. A commercially available crystalline silicon powder having a purity of 99.9% and an average particle diameter of 1 μm, graphite and a pitch resin were mixed in toluene with stirring, and then calcinated at 600° C. in a nitrogen atmosphere for three hours to remove a volatile component. The solid matter was calculated again at 1100° C. in a nitrogen atmosphere for three hours after coarse grinding. A silicon/carbon composite powder was obtained by dry grinding.

This powder was converted into a slurry by using a solution of polyvinylidene fluoride, as a binder, in N-methyl-2-pyrrolidone and, after coating a copper mesh with the slurry, the coated copper mesh was dried at 80° C. and cut into pieces having a size of 22 mm×20 mm. The same operation as in Example 1 was conducted to obtain an anode. The thickness of an anode sintered material was 240 μm.

Then, a square-shaped battery was produced in the same manner as in Example 1 and a charge/discharge test was conducted. The results are shown in Table 1.

EXAMPLE 4

An anode was made in the following procedure. The silicon/carbon composite powder obtained in the same manner as in Example 1 was converted into a slurry by using a solution of polyvinylidene fluoride, as a binder, in N-methyl-2-pyrrolidone and, after coating a PET (polyethylene terephthalate) film with the slurry, the coated film was cut into pieces having a size of 22 mm×20 mm. The cut film was placed on a copper foil having a size of 22 mm×20 mm, followed by contact-bonding using a plate pressing machine. The resulting copper foil-containing coated film was sintered at 800° C. in a nitrogen atmosphere for three hours to obtain an anode. The thickness of an anode sintered material was 220 μm.

Then, a square-shaped battery was produced in the same manner as in Example 1 and a charge/discharge test was conducted. The results are shown in Table 1.

COMPARATIVE EXAMPLE 1

In the same manner as in Example 1, except that a commercially available silicon wafer having a thickness of 200 μm was used as the anode, a square-shaped battery was produced in the same manner as in Example 1 and a charge/discharge test was conducted.

It has been found that any battery whose charge amount exceeds 20 mAh causes short circuit in the test. A high discharge capacity could not be obtained by using a commercially available silicon wafer because it is necessary to limit the amount of lithium to be incorporated into the anode. The results are shown in Table 1.

COMPARATIVE EXAMPLE 2

The silicon/carbon composite powder obtained in the same manner as in Example 1 was converted into a slurry by using a solution of polyvinylidene fluoride as a binder in N-methyl-2-pyrrolidone as a solvent and, and then a copper film was coated with the slurry. The coated copper film was dried at 140° C. and cut into pieces having a size of 22 mm×20 mm, followed by contact-bonding using a plate pressing machine to obtain an anode. The thickness of the coating film of this anode was 210 μm.

Then, a square-shaped battery was produced in the same manner as in Example 1 and a charge/discharge test was conducted. The results are shown in Table 1.

As is apparent from Table 1, a high capacity such as 62 to 98 mAh was obtained in Examples 1 to 4.

EXAMPLE 5

In the same manner as in Example 1, except that the thickness of the anode sintered material was adjusted to 200 μm, a square-shaped battery was produced and a charge/discharge test was conducted.

In the charge/discharge test, a ratio of a discharge capacity at a current density of 200 mA/g to that at a current density of 20 mA/g was evaluated to confirm dependence on the current density. The results are shown in Table 2.

EXAMPLE 6

In the same manner as in Example 1, except that the thickness of the anode sintered material was adjusted to 400 μm, a square-shaped battery was produced and a charge/discharge test was conducted. The results are shown in Table 2.

COMPARATIVE EXAMPLE 3

In the same manner as in Example 1, except that the thickness of the anode sintered material was adjusted to 600 μm, a square-shaped battery was produced and a charge/discharge test was conducted. The results are shown in Table 2.

In Examples 5 and 6, the dependence of the capacity on the discharge density was smaller than that in Comparative Example 3, thereby obtaining such an effect that the capacity is hardly lowered even if the current density is increased.

COMPARATIVE EXAMPLE 4

In the same manner as in Example 1, except that the thickness of the anode sintered material was adjusted to 5 μm, a trial of producing a square-shaped battery was made. However, a battery could not be produced because of poor strength.

EXAMPLE 7

In the same manner as in Example 3, except that the coated film was cut into pieces having a size of 20 mm×40 mm and sintered at 800° C. in a nitrogen atmosphere for three hours, an anode was obtained.

In the same manner as in Example 1, except that the size of a cathode was adjusted to 20 mm×40 mm, the cathode was obtained.

Those prepared by dissolving 1 mol/L of lithium hexafluorophosphate in a mixed solvent of ethylene carbonate and dimethyl carbonate in a volume ratio of 1:1 were used as an electrolyte.

The square-shaped battery thus obtained was allowed to stand at room temperature for 24 hours and subjected to such a process of incorporating and releasing lithium at a current of 5.3 mA (40 mA/g) to the anode, and then a charge/discharge test was conducted at a current of 20 mA (150 mA/g). The results are shown in Table 3.

EXAMPLE 8

The square-shaped battery described in Example 1 was allowed to stand at room temperature for 24 hours and a charge/discharge test was conducted immediately at a current of 20 mA. The results are shown in Table 3.

As is apparent from Table 3, there could be obtained such an effect that the capacity is remarkably increased by subjecting the assembled battery to an electrochemical charge/discharge treatment.

As is apparent from the above explanation, according to the present invention, it becomes possible to reduce contact resistance between a sintered material containing silicon and a current collector, thereby providing the secondary battery with a satisfactory high capacity.

TABLE 1

| | Discharge capacity (mAh) |
|---|---|
| Example 1 | 80 |
| Example 2 | 62 |
| Example 3 | 98 |
| Example 4 | 78 |
| Comp. Example 1 | 5 |
| Comp. Example 2 | 5 |

TABLE 2

| | Thickness of anode ($\mu$m) | Dependence on discharge current density |
|---|---|---|
| Example 5 | 200 | 0.9 |
| Example 6 | 400 | 0.8 |
| Comp. Example 3 | 600 | 0.3 |

Dependence on discharge current density:

$$\frac{\text{Discharge capacity at current density of 200 mA/g}}{\text{Discharge capacity at current density of 20 mA/g}}$$

TABLE 3

| | Battery capacity (mAh) |
|---|---|
| Example 7 | 200 |
| Example 8 | 50 |

What is claimed is:

1. A process for producing an anode for a secondary battery, said process comprising:
   (a) adding a binder and a solvent to a silicon-containing anode material to prepare a slurry;
   (b) coating a base material made of a foil or mesh of conductive metal with the slurry, and then removing the solvent to form a coated film; and
   (c) sintering the coated film in a non-oxidizing atmosphere, thereby integrating a sintered material of the coated film with the base material.

2. A process according to claim 1, wherein the silicon-containing anode material is a composite powder obtained by heat-treating silicon or silicon compound in a non-oxidizing atmosphere in the presence of a material to be carbonized by the heat treatment or a carbon material.

3. An anode for a secondary battery comprising:
   a base material made of a foil or mesh of conductive metal; and
   an anode sintered material formed on the base material integrally with the base material by the process of sintering a coated film which is coated on the base material and comprises a silicon-containing anode material and a binder.

4. A process for producing an anode for a secondary battery, said process comprising:
   (a) adding a binder and a solvent to a silicon-containing anode material to prepare a slurry;
   (b) coating a base film for coating with the slurry, and then removing the solvent to form a coated film;
   (c) peeling the coated film from the base film for coating, and then contact-bonding the coated film to a base material made of a foil or mesh of conductive metal; and further sintering the coated film, thereby integrating a sintered material of the coated film with the base material.

5. An anode for a secondary battery consisting essentially of:
   a sintered material which contains silicon as an anode active material and a carbon material; and
   a base material made of a foil or mesh of conductive metal,
      wherein the sintered material is integrated with the base material, and has a thickness in a range of 10 to 500 $\mu$m and a base area of not less than 4 cm$^2$.

6. A non-aqueous secondary battery comprising:
   an anode obtained by sintering a coated film comprising a silicon-containing anode material and a binder and a base material made of a foil or net of conductive material, thereby integrating a sintered material of the coated film with the base material;
   a cathode containing a lithium transition metal oxide; and
   an electrolyte dissolving a lithium compound in an organic solvent, or a solid electrolyte containing a lithium ion-conductive non-aqueous electrolyte, the solid electrolyte being obtained by incorporating a lithium compound into a polymer or retaining the organic solvent containing the lithium compound dissolved therein with the polymer.

7. An secondary battery according to claim 6, wherein the battery is subjected to an electrochemical charge and discharge treatment.

8. An anode for a secondary battery consisting essentially of:
   a sintered material which contains silicon as an anode active material and a carbon material; and
   a base material made of a foil or mesh conductive metal,
      wherein the sintered material is integrated with the base material by the process of sintering a silicon-containing anode material, and has a thickness in a range of 10 to 500 $\mu$m and a base area of not less than 4 cm$^2$.

* * * * *